United States Patent
Im et al.

(10) Patent No.: US 8,052,409 B2
(45) Date of Patent: Nov. 8, 2011

(54) DEVICE FOR MOLDING AN AIR MAT

(75) Inventors: Dong-gyu Im, Ansan-si (KR); Gin-kyu Choi, Ansan-si (KR)

(73) Assignee: Ceragem Co., Ltd, Cheonan-si (KR)

( * ) Notice: Subject to any disclaimer, the term of this patent is extended or adjusted under 35 U.S.C. 154(b) by 0 days.

(21) Appl. No.: 12/874,754

(22) Filed: Sep. 2, 2010

(65) Prior Publication Data

US 2010/0330222 A1 Dec. 30, 2010

Related U.S. Application Data

(62) Division of application No. 11/916,634, filed as application No. PCT/KR2006/000743 on Mar. 3, 2006, now Pat. No. 7,807,095.

(30) Foreign Application Priority Data

Jun. 8, 2005 (KR) .................. 10-2005-0048853
Oct. 4, 2005 (KR) .................. 10-2005-0093038

(51) Int. Cl.
*B29C 41/04* (2006.01)
*B29C 41/20* (2006.01)

(52) U.S. Cl. ........ 425/121; 264/259; 264/261; 264/310; 425/123; 425/425; 425/429

(58) Field of Classification Search .................. 425/117, 425/121, 123, 425, 429, 435; 264/259, 261, 264/310
See application file for complete search history.

(56) References Cited

U.S. PATENT DOCUMENTS

| 4,043,721 A | * | 8/1977 | Lemelson ..................... 425/435 |
| 5,267,365 A | | 12/1993 | Walter |
| 5,490,292 A | | 2/1996 | Auburn |
| 5,561,875 A | | 10/1996 | Graebe |
| 6,212,719 B1 | | 4/2001 | Thomas et al. |

FOREIGN PATENT DOCUMENTS

JP 2003260089 A 9/2003
KR 1020060057067 A 5/2006

* cited by examiner

*Primary Examiner* — James Mackey
(74) *Attorney, Agent, or Firm* — Sughrue Mion, PLLC

(57) ABSTRACT

The present invention relates to a method for manufacturing an air mat that reduces the number of manufacturing processes by means of rotational molding, while preventing the generation of defective products, to a device for molding an air mat, and to an air mat manufactured and molded by the method and device. In a method for manufacturing an air mat formed in such a manner as to integrally couple a cushion part having a plurality of air bags arranged therein for containing air at the insides thereof with a plate-shaped lower sheet disposed on the lower surface of the cushion part, the method includes the steps of: preparing a lower mold having a plurality of air bag molding recesses having given depths arranged at given intervals thereon, for molding the cushion part of the air mat.

6 Claims, 14 Drawing Sheets

Fig. 3
(a)
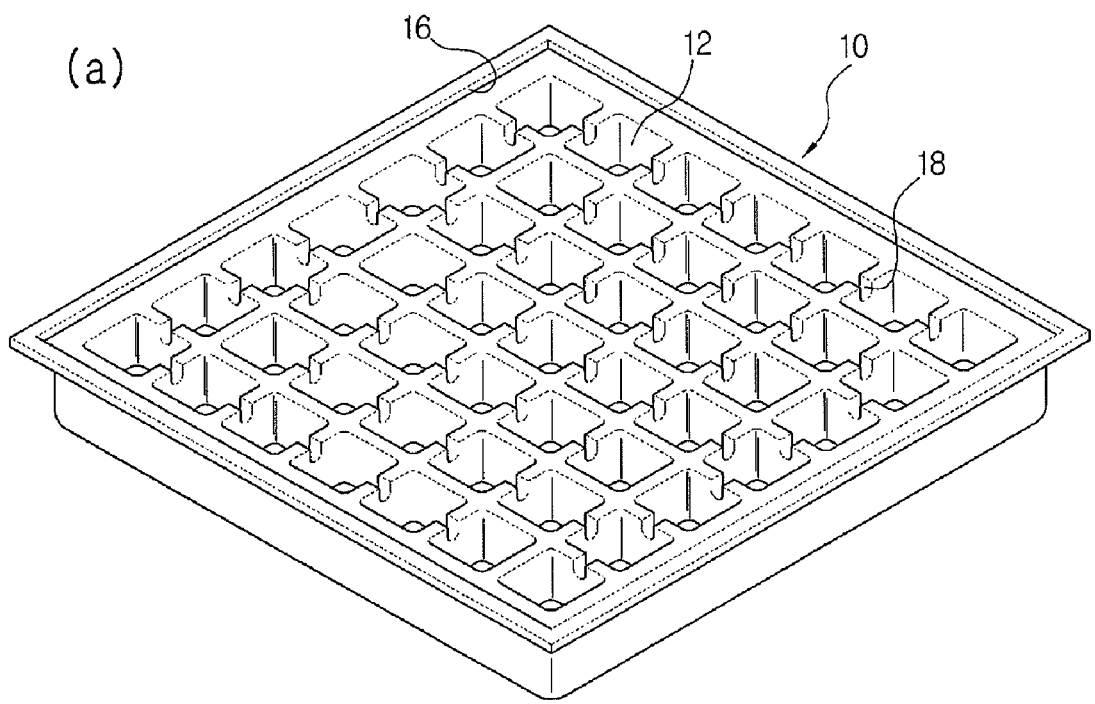
(b)
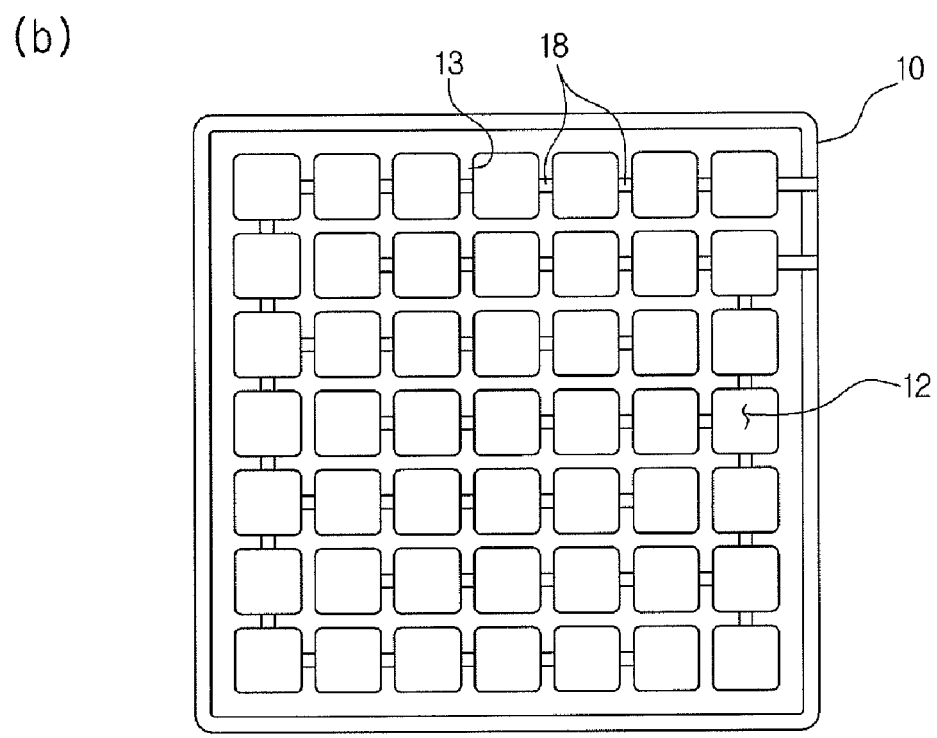

Fig. 11
(a)
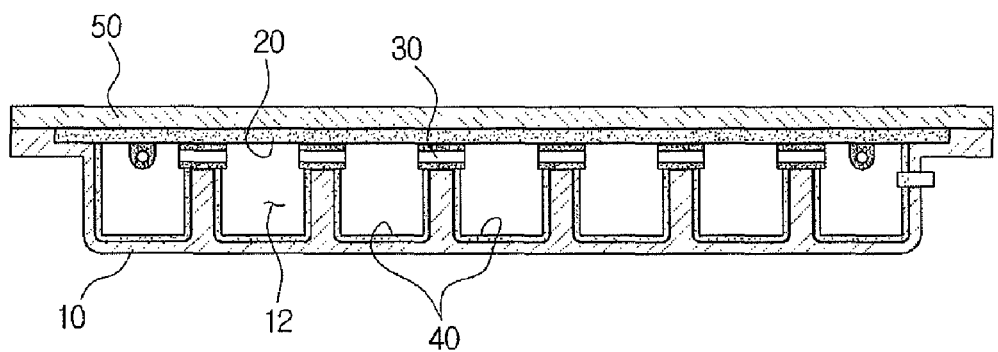
(b)
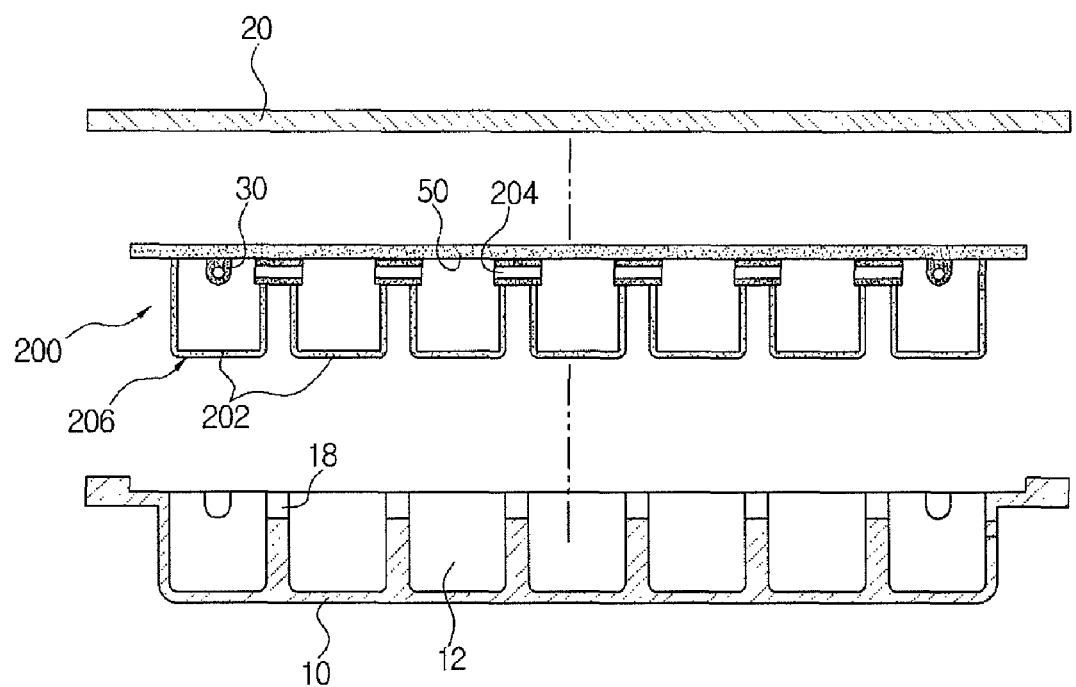

DEVICE FOR MOLDING AN AIR MAT

CROSS-REFERENCE TO RELATED APPLICATIONS

The present application is a Divisional of U.S. application Ser. No. 11/916,634 (allowed), filed Dec. 5, 2007, which is U.S. national Stage of International Application No. PCT/KR2006/000743, which has an international filing date of Mar. 3, 2006, and which claims priority to Korean Patent Application Nos. 10-2005-0048853 and 10-2005-0093038, filed on Jun. 8, 2005 and Oct. 4, 2005, respectively. The entire disclosures of the prior applications are hereby incorporated by reference.

TECHNICAL FIELD

The present invention relates to a method for manufacturing an air mat that reduces the number of manufacturing processes by means of rotational molding, while preventing the generation of defective products, to a device for molding an air mat, and to an air mat manufactured and molded by the method and device.

BACKGROUND ART

Generally, an air mat is an instrument for supplying air to the inside thereof to effect an appropriate cushion force through air pressure, so that a user may rest on the air mat in comfort. As such an air mat can be simple to carry and easily installed in every place, they are widely used.

Especially, the air mat is recently provided with a plurality of embossing air bags formed on the portions abutting against the human body, which provides massaging effects to the user lying on the air mat and reduces unpleasant oppression against him or her.

Most of typical air mats include a cushion part having a plurality of air bags arranged therein, and a lower sheet adapted to be bonded to the lower surface of the cushion part, for tightly sealing the plurality of air bags.

Further, the cushion part or the lower sheet is formed on one side thereof with an air supply hole for supplying air to the inside of each air bag.

Such a conventional air mat is manufactured by means of slush molding in such a manner that plastic resin is first filled in the interior of a mold and is then preheated therein, and after that, when the plastic resin is partially coated to a predetermined thickness on the inner surface of the mold, the filled plastic resin is poured off from the mold and the resin layer having the predetermined thickness is completely gelled and cooled, thereby finishing the cushion part of the air mat.

Next, a plurality of communicating passageways are formed for allowing the plurality of air bags formed in the cushion part to communicate with one another, and the lower sheet that is previously made is then bonded to the lower surface of the cushion part, thereby finishing the whole structure of the air mat.

By the way, the conventional air mat manufacturing method using the slush molding is carried out at a state where the mold is opened on the upper portion thereof according to the characteristics of the slush molding, such that only after the cushion part has been completely molded, the lower sheet can be bonded to the cushion part.

As a result, after the bonding process of the lower sheet with the cushion part is separately carried out, the air mat can be finally made.

More particularly, the bonding process of the lower sheet with the cushion part is conducted by means of high frequency bonding or adhesive bonding. First, in case of the high frequency bonding, a high frequency bonding machine should be separately provided, and also, a relatively long time of period for the bonding process is required, such that the whole manufacturing processes are delayed, thereby making the product costs undesirably raised.

Next, in case of the adhesive bonding, a relatively long time of period for the bonding process is necessary in the same manner as the high frequency bonding, and since the bonding is mostly made by manual operations, it is difficult to provide the firm bonding results of the lower sheet with the cushion part, which results in a low quality of bonding results.

Also, the plurality of communicating passageways should be formed for allowing the adjacent air bags of the cushion part to communicate with each other, such that air can be gently supplied to each of the plurality of air bags.

However, when the slush molding is adopted to mold the cushion part of the air mat, the shape of the cushion part after the molding is very simple, such that the communicating passageways should be made through a separate communicating passageway forming process after the cushion part has been completely molded. Thereby, the whole manufacturing processes are undesirably delayed and the product costs are accordingly raised.

Moreover, since all of the plurality of air bags communicate with one another in the conventional air mat manufactured by means of the slush molding having the above-mentioned problems, it is impossible to partially adjust the cushion forces generated from the air bags.

Especially, in case of a patient lying on the air mat for a long time, he or she should have gentle blood circulation as the oppression of the air bags abutting on his or her body is released partially. However, since all of air bags in the conventional air mat structure communicate with one another, it is really impossible to partially adjust the cushion forces of the air bags.

DISCLOSURE OF INVENTION

Technical Problem

Accordingly, it is an object of the present invention to provide a method for manufacturing an air mat and a device for molding an air mat that forms a cushion part integrally with a lower sheet at a time of molding the cushion part, without having any separate bonding process of the lower sheet with the cushion part, thereby making a number of manufacturing processes reduced.

Another object of the present invention is to provide a method for manufacturing an air mat and a device for molding an air mat that forms a cushion part integrally with a lower sheet at a time of molding the cushion part, thereby achieving firm bonding results which prevent the generation of defective products.

Still another object of the present invention is to provide an air mat and a device for molding an air mat that conducts the molding process of a cushion part at a state where a plurality of communicating passageways are formed, without having any separate process of forming the communicating passageways.

Yet another object of the present invention is to provide an air mat, a method for manufacturing an air mat, and a device for molding an air mat, wherein a plurality of air bags on a cushion part selectively communicate with one another, thereby making the cushion forces generated by the air bags partially adjusted.

Still yet another object of the present invention is to provide an air mat, a method for manufacturing an air mat, and a device for molding an air mat, wherein a plurality of air bags communicate with one another through separate communicating members, thereby preventing air communicating passageways from being damaged.

Technical Solution

To achieve the above objects, according to an aspect of the present invention, there is provided an air mat that includes: a cushion part having a plurality of air bags arranged therein; a lower sheet formed integrally with the lower surface of the cushion part; and an air supply and communication means for supplying air to the interiors of the air bags of the cushion part.

To achieve the above objects, according to another aspect of the present invention, there is provided a method for manufacturing an air mat that includes the steps of: preparing upper and lower molds; pouring resin into the lower mold; coupling a lower sheet with the top portion of the lower mold; coupling the upper mold with the top portion of the lower sheet; and rotating the upper and lower molds coupled with each other by means of a rotational molding machine.

Advantageous Effects

The present invention gives the following advantages:

First, a cushion part is formed integrally with a lower sheet at a time of molding the cushion part by means of rotational molding, without having any separate bonding process or instrument of the lower sheet with the cushion part, thereby making a number of manufacturing processes reduced and making the product costs desirably lowered.

Second, a cushion part is formed integrally with a lower sheet at a time of molding the cushion part, thereby achieving form bonding results which prevent the generation of defective products.

Third, a cushion part and a plurality of communicating passageways are at the same time molded, without having any separate process of forming the communicating passageways.

Fourth, a plurality of air bags on a cushion part selectively communicate with one another, thereby making the cushion forces generated by the air bags partially adjusted.

Finally, a plurality of air bags communicate with one another through separate communicating members, thereby preventing air communicating passageways from being damaged.

BRIEF DESCRIPTION OF THE DRAWINGS

FIGS. 3(a) and 3(b) are perspective and plane views showing the lower mold employed in the method for manufacturing an air mat according to the present invention;

FIGS. 11(a) and 11(b) are sectional views showing a process of demolding the manufactured air mat according to the method for manufacturing an air mat of the present invention;

BEST MODE FOR CARRYING OUT THE INVENTION

According to the present invention, there is provided an air mat including: a cushion part having a plurality of air bags arranged therein; a lower sheet formed integrally with the lower surface of the cushion part; and an air supply means and communication means for supplying air to the interiors of the air bags of the cushion part.

Figure 1:
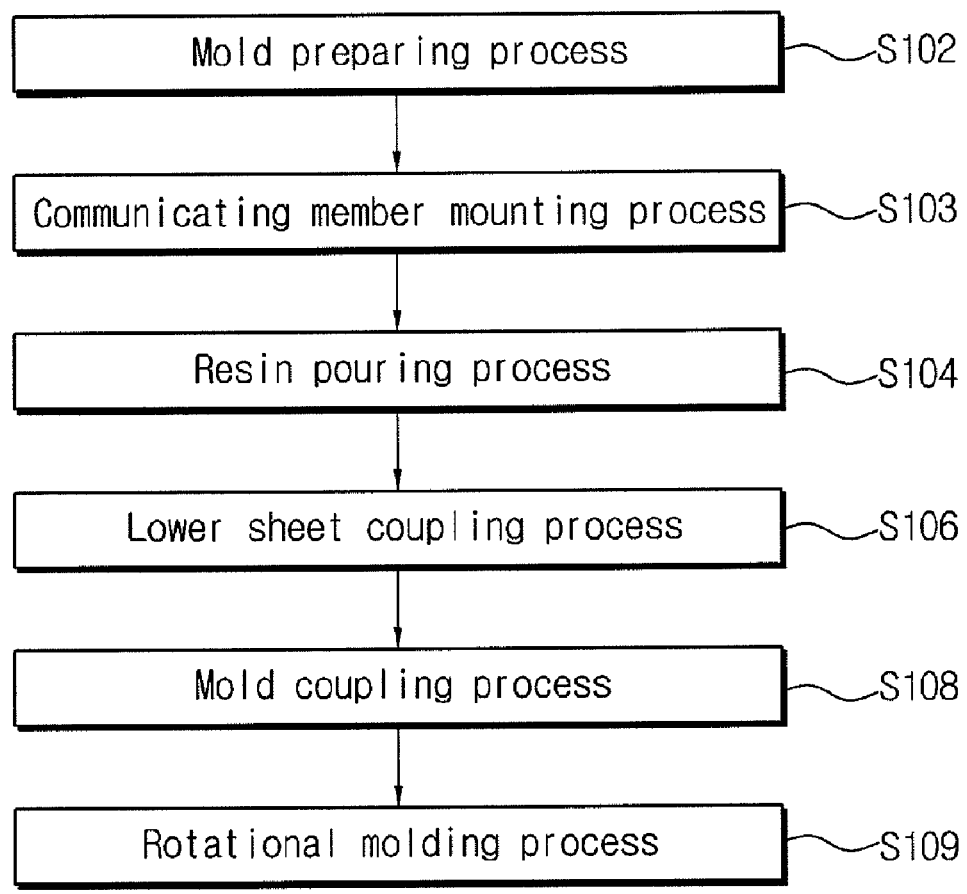
FIG. 1 is a flow chart showing a method for manufacturing an air mat according to the present invention.

As shown in FIG. 1, a method for manufacturing the air mat according to the present invention includes the steps of: preparing upper and lower molds at a step S102; pouring resin into the lower mold at a step S104; coupling a lower sheet with the top surface of the lower mold at a step S106; coupling the upper mold with the top surface of the lower sheet at a step S108; and rotating the upper and lower molds coupled with each other by means of a rotational molding machine at a step S109.

Figure 2:
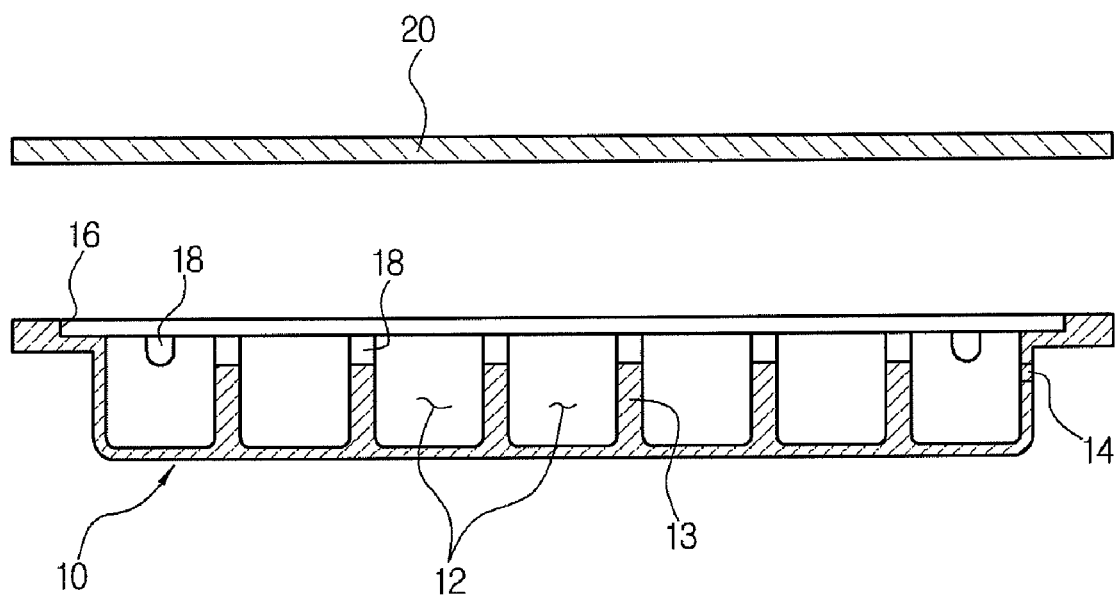
FIG. 2 is a sectional view showing a mold preparing process of the method for manufacturing an air mat according to the present invention.

First, as shown in FIG. 2, at the mold preparing process S102 a lower mold 10 is prepared for molding a cushion part 206 of an air mat 200, and an upper mold 20 that is adapted to be mounted on the top surface of the lower mold 10 is prepared for tightly sealing the interior of the lower mold 10.

At this time, as shown in FIG. 2 and FIGS. 3(a) and 3(b), the lower mold 10 is provided with a plurality of air bag molding recesses 12 each having a given depth, for molding a plurality of air bags of the cushion part 206 on the air mat 200.

The plurality of air bag molding recesses 12 are spaced equally to one another, while having a partition 13 formed between the adjacent air bag molding recesses 12, and at least one or more air bag molding recesses 12 has an air supply hole 14 communicating with the outside.

The lower mold 10 is further provided with a stepped portion 16 formed along the four sides of the top surface thereof, for mounting a lower sheet 50 as will be discussed below thereon.

The upper mold 20 that is adapted to cover the top surface of the lower mold 10 is a plate having an area larger than the lower mold 10.

If the air supply hole 14 of the lower mold 10 for supplying air to the air bags 202 of the air mat 200 is not formed at every air bag molding recess 12, but formed at one or two specific air bag molding recesses 12, the plurality of air bags 202 of the air mat manufactured later should communicate with one another such that the air supplied to any one of the air bags 202 can be supplied uniformly to all of the plurality of air bags 202.

The process of forming a plurality of communicating passageways 204 each adapted to make the adjacent air bags 202 of the air mat 200 communicate with each other is carried out at the same time together with the process of molding the cushion part 206, such that the number of whole manufacturing processes can be reduced, without any separate communicating passageway molding process.

In this case, first, after the mold preparing process S102 a communicating member mounting process S103 of previously mounting a plurality of communicating members 30 to the lower mold 10 is carried out, such that the communicating members 30 and the cushion part 206 are integrally formed with each other and at the same time the adjacent air bags 202 of the air mat 200 communicate with each other by means of the communicating members 30.

Figure 4:
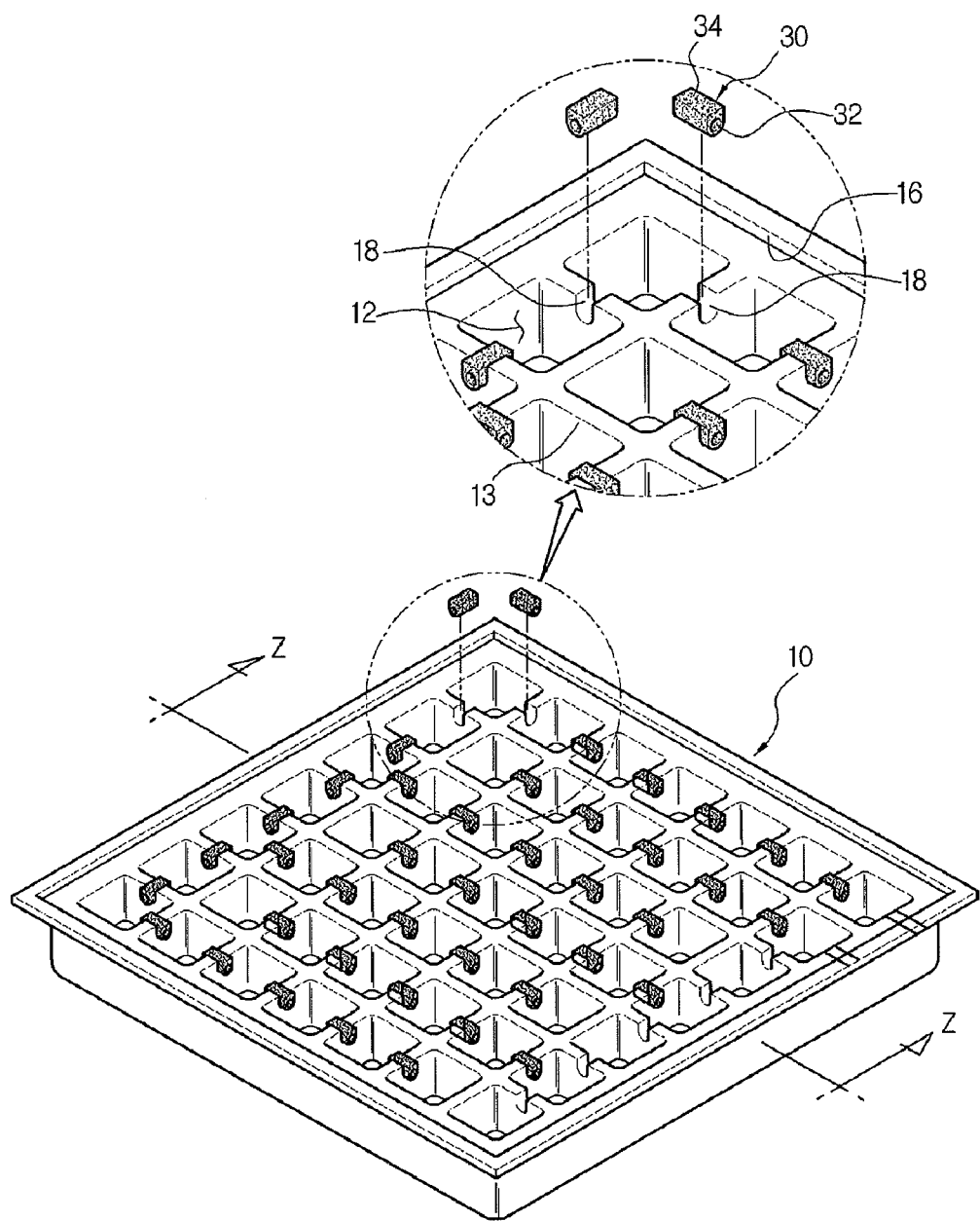
FIGS. 4 and 5 are perspective and sectional views showing a communicating member forming process in the method for manufacturing an air mat according to the present invention.

To carry out the communicating member mounting process S103, as shown in FIG. 4, a cut groove 18 of a given depth is formed on a partition 13 formed between the adjacent air bag molding recesses 12 of the lower mold 10 during the mold preparing process S102.

The communicating member mounting process S103 is carried out in such a manner as to detachably mount the plurality of communicating members 30 at the cut grooves 18, each of the plurality of communicating members 30 having a communicating hole 32 formed to be passed therethrough.

The communicating member 30 has the same shape and size as the cut groove 18 and has a shape of a connection clip 34 having the communicating hole 32 formed in the middle portion thereof in such a manner as to pass through both end portions thereof.

Figure 5:
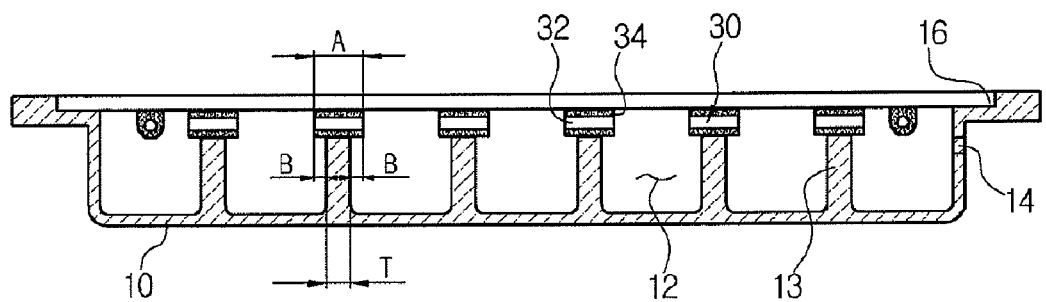

At this time, the connection clip 34 is, as shown in FIG. 5, made in such a manner as to have a length A longer than a thickness T of the partition 13 of the lower mold 10, and thus, when mounted at the cut groove 18, it is mounted between the adjacent air bag molding recesses 12, while being protruded by a given length B from the cut groove 18 at both end portions thereof.

Even though only the cut groove 18 is formed, without having the communicating member 30, a resin composite material 40 that is poured into the air bag molding recess 12 during the resin pouring process S104 is coated on the inner wall of the air bag molding recess 12 of the lower mold 10 and on the inner periphery of the cut groove 18 during the resin pouring process S104, thereby finishing forming the communicating passageway 204.

During the resin composite material 40 is coated on the cut groove 18 and the air bag molding recess 12, however, it may flow another air bag molding recess 12 through the cut groove 18 before molding, and as a result, the plurality of air bags 202 of the air mat 200 after molding are different from one another in their thickness. During the coating process, the cut groove 18 is blocked or coated to a given thickness or more, thereby failing to gently move air in the air mat 200.

As the communicating members 30 are inserted into the cut grooves 18 through the communicating member mounting process S103, the communicating passageways are formed by means of the communicating holes 32 of the communicating members 30, thereby overcoming the problem that the resin composite material 40 flows another air bag molding recesses 12 through the cut grooves 18 to make the cut grooves 18 closed, thereby failing to form the communicating passageways 204 of the air mat 200.

At the rotational molding process S109 as will be discussed below, especially, the resin composite material 40 is applied on the wall surfaces of the air bag molding recesses 12 by the formation of the centrifugal force upon the rotation, and at this time, as the communicating members 30 are protruded by the give length B from the cut grooves 18 at the both end portions thereof, the movement of the resin composite material 40 from the communicating grooves 32 of the communicating members 30 to another communicating grooves 32 can be completely prevented.

In case of additionally employing the plurality of communicating members 30, the cut grooves 18 just serve to secure the plurality of communicating members 30 thereto.

Figure 6:
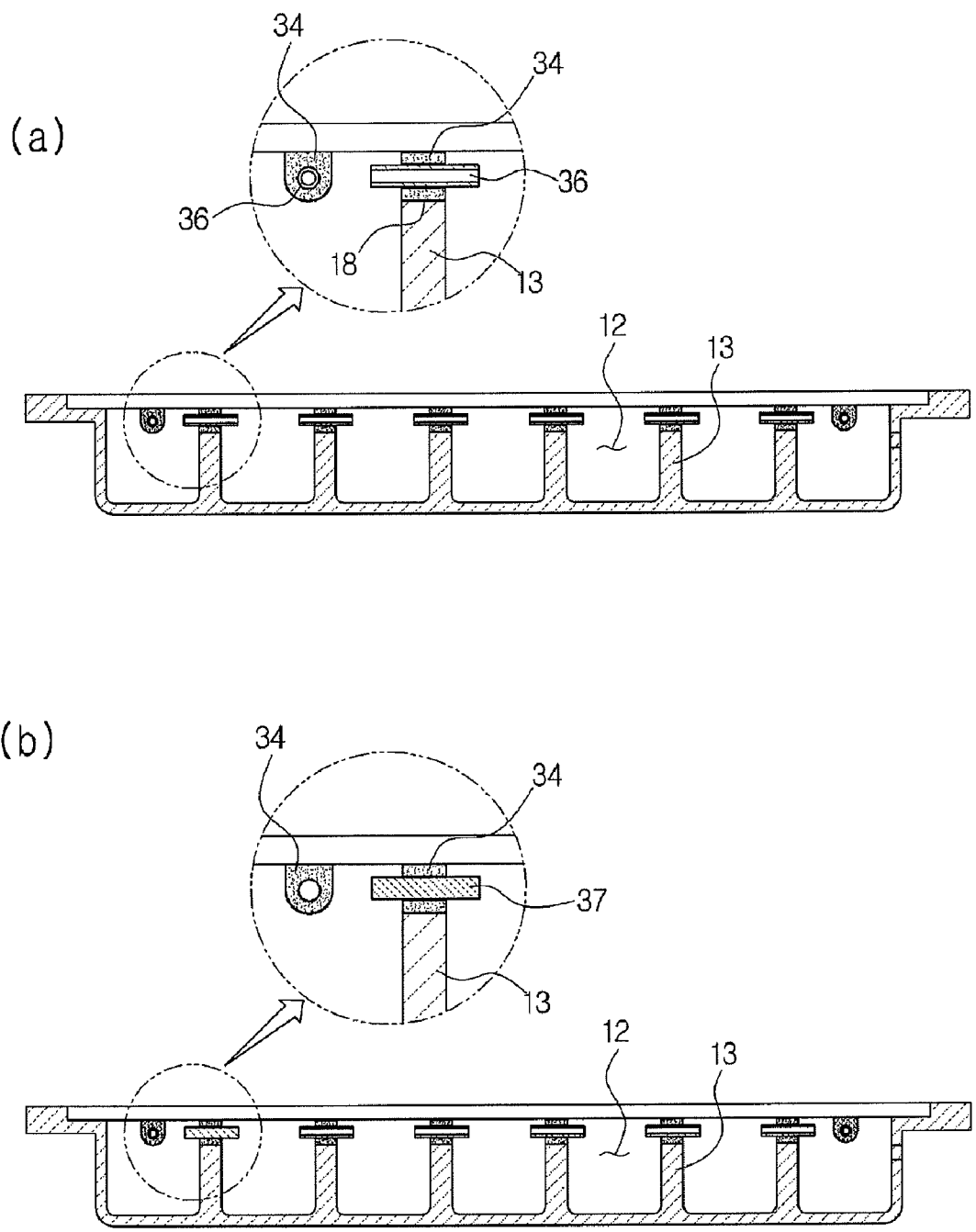
FIGS. 6(a) and 6(b) are sectional views showing a connecting tube mounted at a connecting clip during the communicating member forming process.

As discussed above, the plurality of communicating members 30 may be used as only the connection clips 34, and otherwise, as shown in FIG. 6(a), a communicating tube 36 is inserted separately into the communicating hole 32 of each connection clip 34 such that the adjacent air bag molding recesses 12 can communicate with each other by means of the communicating tube 36 into the communicating hole 32.

At this time, the length of the connection clip 34 is not necessarily longer than the thickness T of the partition 13, but the length of the communicating tube 36 should be longer than the thickness T of the partition 13, which prevents the resin composite material during the rotational molding process from being moved to another grooves through the communicating tube 36 or prevents the communicating tube 36 from being clogged, as mentioned above.

Otherwise, as shown in FIG. 6(b), bars 37 are inserted into the communicating holes 32 of the connection clips 34, thereby preventing the communicating holes 32 of the connection clips 34 from being closed by the resin composite material 40 during the molding process.

In this case, after manufacturing the air mat 200 is finished, the bars 37 are separated from the connection clips 34, thereby allowing the communicating holes 32 of the connection clips 34 to be opened.

As shown in FIG. 3(b), further, the cut grooves 18 and the communicating members 30 are selectively mounted at the partitions 13 of the air bag molding recesses 12, such that the air bags 202 of the air mat 200 partially communicate with one another.

As mentioned above, the communicating member mounting process S103 is not needed in a structure where air is separately supplied to every air bag 202 of the air mat 200, but it is selectively adopted only in case where air is supplied at a time to the air bags 202 of the air mat 200.

Figure 7:
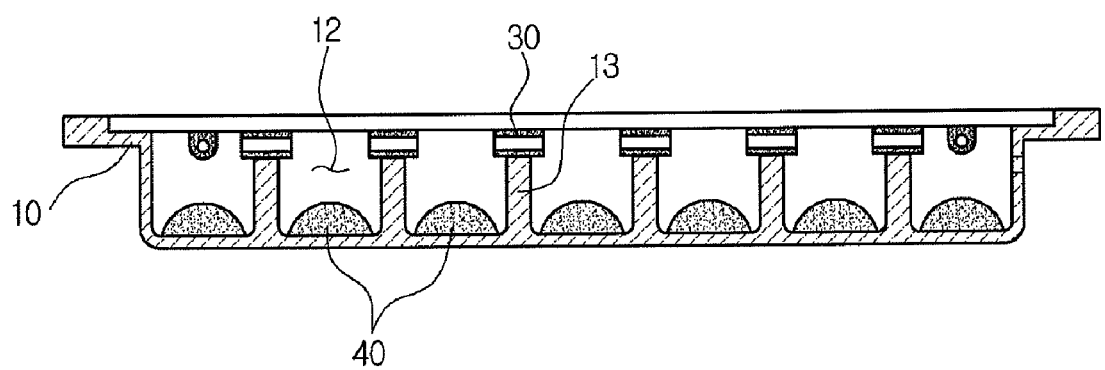
FIG. 7 is a sectional view showing a resin pouring process in the method for manufacturing an air mat according to the present invention.

After the processes of preparing the lower mold 10 and the upper mold 20 and also of mounting the communicating members 30, as shown in FIG. 7, the resin pouring process 5104 is conducted where the resin composite material 40 is poured into the air bag molding recesses 12 of the lower mold 10 for molding the air bags 202 of the air mat 200.

The resin composite material 40 used during the resin pouring process 5104 is made by mixing powder type synthetic resin and a plasticizer adapted to increase the thermoplasticity of the synthetic resin to mold it well at a high temperature.

The powder type synthetic resin is used as a PVC (polyvinyl chloride) material that is thermally processed with ease, and the plasticizer is selectively used according to the kinds of synthetic resin, preferably, as a phthalate plasticizer like DINP, DNOP, or DIDP having relatively less contents of carcinogens or environmental hormones.

If separate pigments are added to the resin composite material 40, the air mat 200 having desired colors can be manufactured.

Further, before the resin composite material 40 is poured into the lower mold 10 separate molding bars 300 are fitted to the air supply holes 14 formed in the lower mold 10, thereby preventing the resin composite material 40 from flowing to the outside and also forming air supply holes 208 at the air bags 202 of the air mat 200 during the molding process of the cushion part 206 of the air mat 200.

If the air supply holes 14 are not formed in the lower mold 10, the air supply holes 208 of the air mat 200 may be simply formed at given positions after the air mat 200 is manufactured, and therefore, the process of mounting the molding bars 300 is selectively adopted.

After the resin pouring process S104 is finished, the lower sheet mounting process S106 is carried out where the lower sheet 50 constituting the air mat 200, together with the cushion part 206, is mounted to the lower mold 10.

Figure 8:
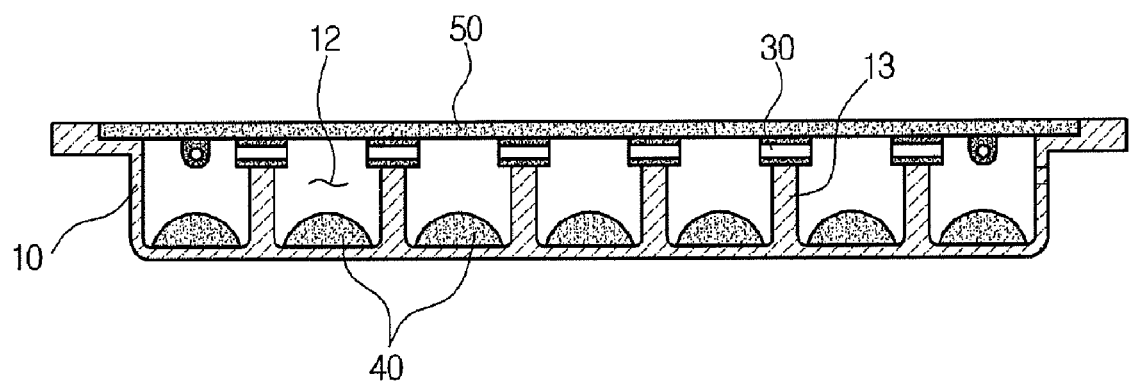
FIG. 8 is a sectional view showing a lower sheet mounting process in the method for manufacturing an air mat according to the present invention.

The lower sheet 50 is, as shown in FIG. 8, made of a flat plate, which is mounted along the stepped portion 16 formed on the top surface of the lower mold 10 to cover the air bag molding recesses 12. At this time, if the lower sheet 50 is formed of the same material as the resin composite material 40, the cushion part 206 molded by the resin composite material 40 during the rotational molding process S109 can be well formed integrally with the lower sheet 50, thereby achieving more rigid bonding results between them.

Moreover, if the communicating members 30 are made of the same material as the resin composite material 40 and the lower sheet 50, the bonding results among the cushion part 206, the lower sheet 50, and the communicating members 30, that is, all parts of the air mat 200 can be made more rigidly.

Figure 9:
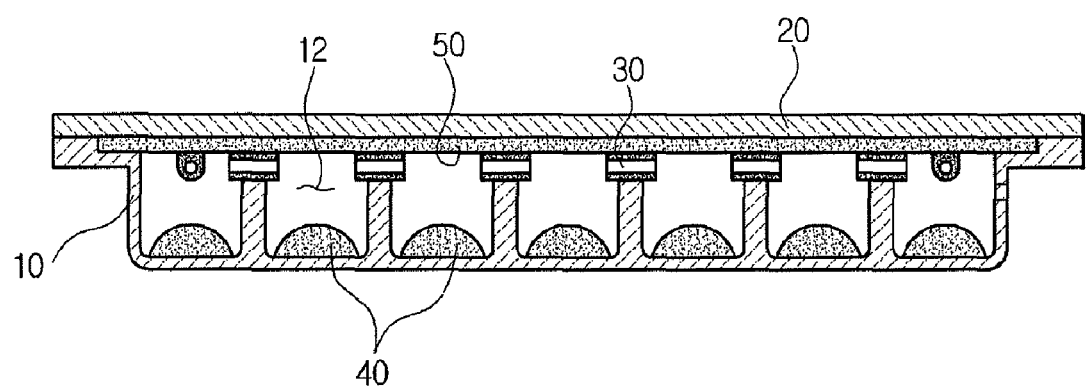
FIG. 9 is a sectional view showing an upper mold mounting process in the air mat manufacturing procedure according to the present invention.

If the lower sheet mounting process S106 is finished, as shown in FIG. 9, the upper mold 20 previously prepared together with the lower mold 10 is mounted on the top surface of the lower mold 10, thereby rigidly fixing the lower sheet 50 and tightly sealing the resin composite material 40 filled into the air bag molding recesses 12 of the lower mold 10, which allows the air mat 200 to be well molded.

At this time, the upper mold 20 and the lower mold 10 are firmly coupled with each other through a separate coupling means like coupling bolts C.

When the upper mold 20 and the lower mold 10 are coupled with each other, they are rotated by means of a rotational molding machine 60, thereby conducting the rotational molding process 5109 for finally molding the air mat 200.

Figure 10:
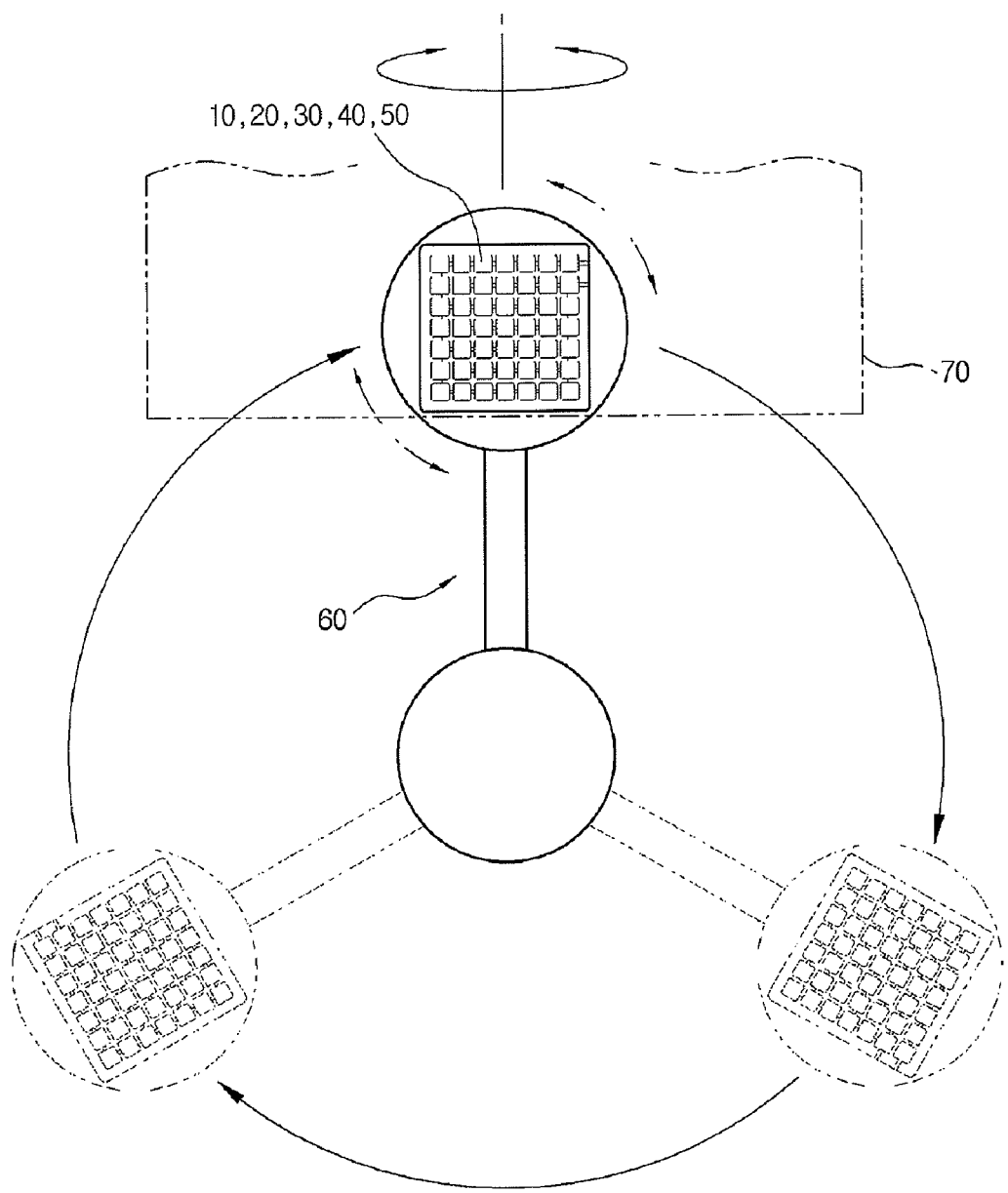
FIG. 10 is a schematic view showing a rotating molding process in the method for manufacturing an air mat according to the present invention.

The rotational molding process S109 is conducted, as shown in FIG. 10, such that the lower and upper molds 10 and 20 are rotated in given directions by means of the rotational molding machine 60 and at the same time they are heated by means of a heating machine 70, thereby making the resin composite material 40 filled into the lower mold 10 coated at a given thickness on the inner surface of the lower mold 10.

While the rotational molding process S109 is being conducted, as shown in FIG. 11(*a*), the resin composite material 40 filled into the lower mold 12 is evenly applied to the inner wall surfaces of the air bag molding recesses 12 by the centrifugal force generated by of the rotation of the rotational molding machine 60, such that the air bags 202 of the air mat 200 are molded, and during this process, the resin composite material 40 is also applied to the communicating members 30, such that the air bags 202 of the air mat 200, the lower sheet 50, and the communicating members 30 are bonded integrally to one another.

At this time, also, as each of the communicating members 30 is protruded at both ends thereof from the partition 13, the resin composite material 40 can not flow into the communicating hole 32 thereof during the application of the resin composite material 40.

After that, as shown in FIG. 11(*b*), the upper mold 20 and the lower mold 10 are separated, and when the lower sheet 50 is separated from the lower mold 10, the air bags 202 of the air mat 200 and the communicating members 30 are formed integrally with each other at the lower surface of the lower sheet 50, and the air bags 202 communicate with one another through the communicating holes 32 of the communicating members 30. That is to say, the air mat 200 is fabricated where the cushion part 206, the lower sheet 50, and the communicating members 30 are molded integrally to one another.

If the thickness of the lower mold 10 is lower than that of the upper mold 20, during the rotational molding process S109 the thermal conduction of the inner surface of the lower mold 10 is faster than that of the upper mold 20, such that as the thermal conduction of the lower mold 10 is first raised, the resin composite material 40 filled into the lower mold 10 is first coated.

As a result, the cushion part 206 of the air mat formed in the lower mold 10, that is, the thickness of the air bag 202 is higher than the thickness of the lower sheet 50. As the thickness and temperature of each mold are adjusted, the thickness of the cushion part 206 of the air mat 200 and the thickness of the lower sheet 50 are all controlled.

During the cushion part molding process the cushion part 206 is molded integrally with the lower sheet 50, without having any separate bonding process of the lower sheet with the cushion part, thereby making the manufacturing process of the air mat simple, making the number of manufacturing processes reduced, and making the product costs also lowered, and the rigid coupling of the cushion part 206 with the lower sheet 40 is also achieved, thereby preventing the generation of defective products.

Also, during the cushion part molding process the communicating passageways of the plurality of air bags 202 are molded together with the cushion part, without having any separate process of molding the communicating passageways, and the communicating members are molded in such a manner as to cover the communicating passageways of the air mat, thereby preventing the communicating passageways from being damaged.

Figure 12:
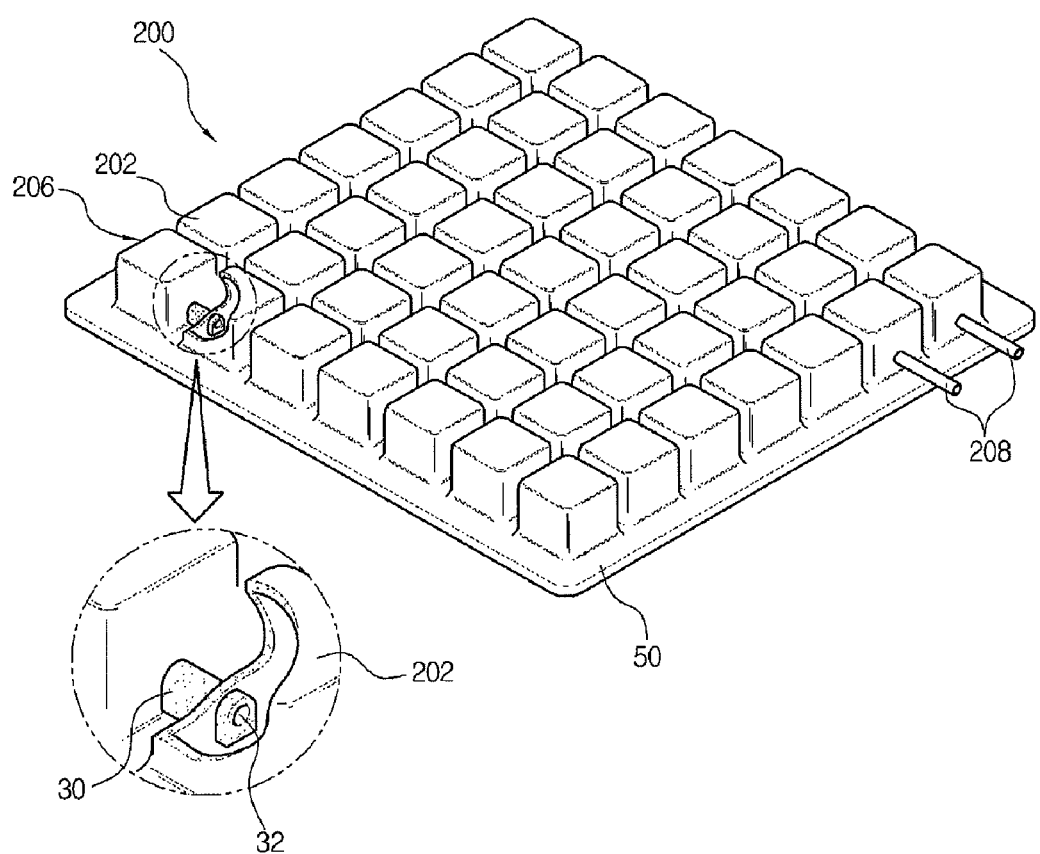
FIG. 12 is a perspective view showing the whole structure of the air mat according to the present invention.

As shown in FIG. 12, the air mat 206 that is manufactured according to the method for manufacturing an air mat and the device for molding the air mat, as mentioned above, includes: the cushion part 206 having the plurality of air bags 202 arranged thereon; the lower sheet 50 formed integrally with the lower surface of the cushion part 206; and the air supply and communication means 210 having the air supply holes 208 formed on at least one or more surfaces of the cushion part 206 and the lower sheet 50 for supplying air from the outside to the air bags 202 and the communicating members 30 adapted to make the air bags 202 communicate with one another.

Under the above structure, the air supply and communication means 210 is selectively formed only on the air bags 202 specifically positioned among the plurality of air bags 202, for supplying air only to the specifically positioned air bags 202 and also for selectively adjusting the air pressures only thereto.

Figure 13:
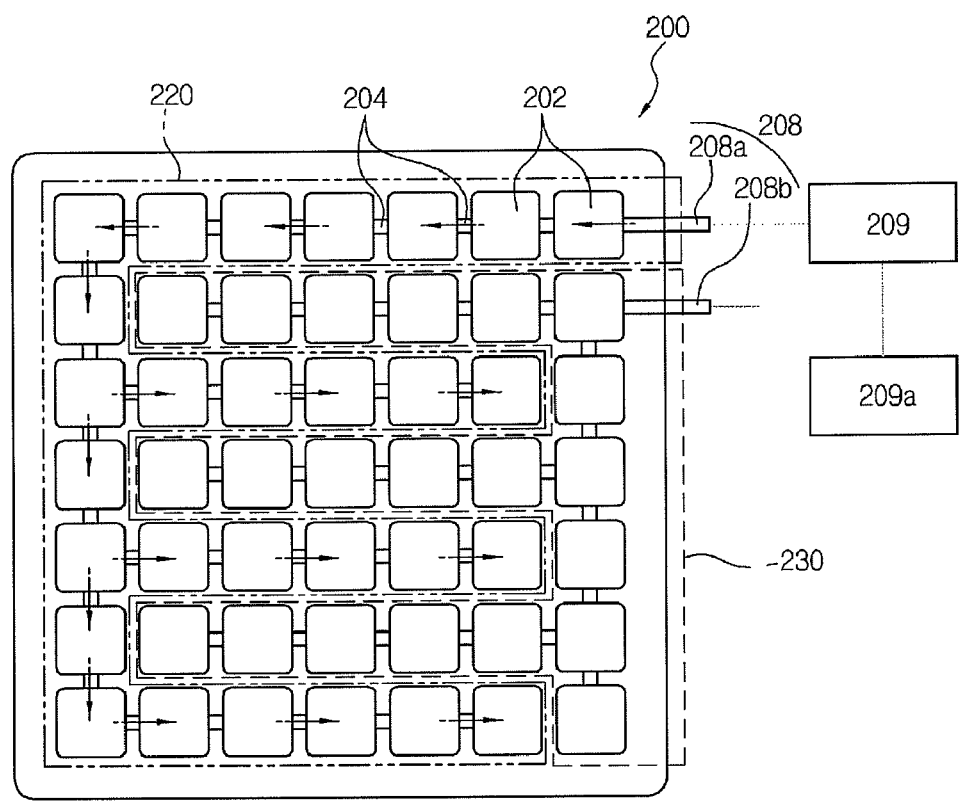
FIG. 13 is a plane view showing one communicating arrangement of the air bags in the air mat according to the present invention.

The air supply and communication means 210 is formed, as shown in FIG. 13, with a first communication group 220 having a first air supply hole 208*a* and the plurality of communicating members 30 connected to the first air supply hole 208a for making the air bags positioned on specific rows, that is, on odd rows communicate with one another, and a second communication group 230 having a second air supply hole 208b and the plurality of communicating members 30 connected to the second air supply hole 208b for making the air bags excepting the air bags contained in the first communication group 220, that is, the air bags positioned on even rows communicate with one another.

Figure 14:
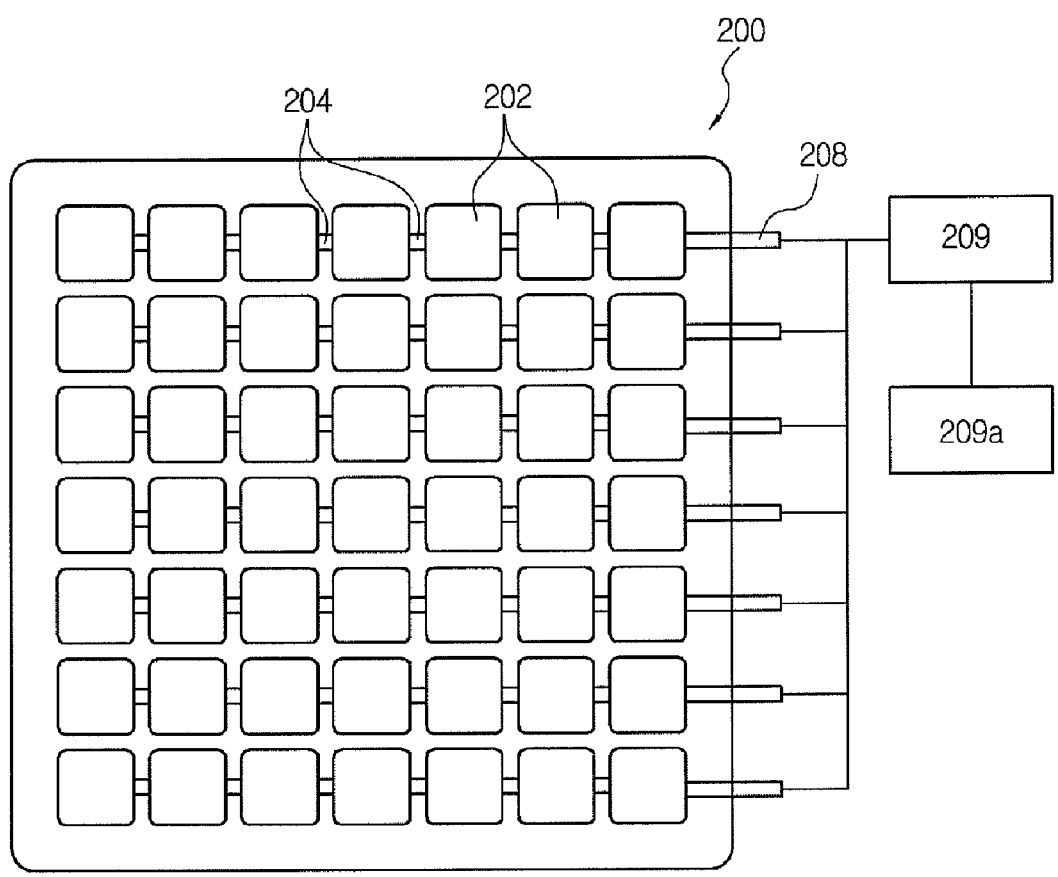
FIG. 14 is a plane view showing another type of arrangement of the air bags in the air mat according to the present invention.

Otherwise, as shown in FIG. 14, the air supply hole 208 and the communicating members 30 may be formed on every row in the arrangements of the air bags 202.

Furthermore, the air supply hole 208 can supply air to the air bags with the help of an air supply means 209 mounted separately.

If air is supplied to the air bags 202 through the air supply means 209, as shown in FIG. 13, the air supplied to the air bags positioned on the odd rows are moved only to the air bags positioned on the odd rows, and in the same manner as above, the air supplied to the air bags positioned on the even rows are moved only to the air bags positioned on the even rows.

At this time, in case where the cushion forces should be adjusted with respect to the air bags arranged on the odd rows according to the conditions of a user's body, the first air supply hole 208a is opened to decrease only the air pressures of the odd-positioned air bags.

According to one of some features of the present invention, as the air supply and communication means is selectively formed with respect to the air bags of the air mat, the cushion forces can be partially adjusted.

What is claimed is:

1. A device for molding an air mat formed in such a manner as to integrally couple a cushion part having a plurality of air bags arranged therein for containing air at the insides thereof with a plate-shaped lower sheet disposed on a lower surface of the cushion part, the device comprising:
    a lower mold having a plurality of air bag molding recesses having given depths and arranged at given intervals thereon, for molding the cushion part of the air mat;
    the plate-shaped lower sheet disposed on a top portion of the lower mold, for covering the plurality of air bag molding recesses of the lower mold;
    a plate-shaped upper mold disposed on a top surface of the lower sheet in such a manner as to be coupled with the lower mold;
    a rotational molding machine for rotating the upper and lower molds coupled with each other such that a resin composite material is coated on inner surfaces of the plurality of air bag molding recesses and at the same time the cushion part is formed integrally with the lower sheet;
    the lower mold is provided with cut grooves each having a given depth formed on a partition between adjacent air bag molding recesses; and
    a plurality of communicating members are detachably mounted on the cut grooves, for making the plurality of air bag molding recesses of the lower mold communicate with one another, each of the plurality of communicating members having a communicating hole passed through both end portions thereof and having a length larger than the thickness of each of the partitions of the lower mold, such that when the individual communicating member is mounted on the individual cut groove, the both end portions thereof are disposed within the adjacent air bag molding recesses.

2. The device for molding an air mat according to claim 1, wherein each of the plurality of communicating members is a connection clip having said communicating hole passed through the both end portions thereof and having the same size as each of the cut grooves of the lower mold in such a manner as to be detachably mounted on the individual cut groove.

3. The device for molding an air mat according to claim 1, wherein each of the plurality of communicating members comprises a connection clip having said communicating hole passed through the both end portions thereof and having the same size as each of the cut grooves of the lower mold in such a manner as to be detachably mounted on the individual cut groove and a communicating tube inserted into the communicating hole of each connection clip, the communicating tube having a length larger than the thickness of each of the partitions of the lower mold, such that when mounted on the individual cut groove, the both end portions thereof are disposed within the adjacent air bag molding recesses.

4. The device for molding an air mat according to claim 1, wherein the cut grooves and the communicating members of the lower mold are selectively formed on the plurality of partitions of the air bag molding recesses, for making the air bag molding recesses selectively communicate with one another.

5. The device for molding an air mat according to claim 2, wherein the cut grooves and the communicating members of the lower mold are selectively formed on the plurality of partitions of the air bag molding recesses, for making the air bag molding recesses selectively communicate with one another.

6. The device for molding an air mat according to claim 3, wherein the cut grooves and the communicating members of the lower mold are selectively formed on the plurality of partitions of the air bag molding recesses, for making the air bag molding recesses selectively communicate with one another.

* * * * *